April 23, 1968

E. REICHERT 3,379,310

METHOD AND APPARATUS FOR THE WET
GRAVITY CONCENTRATION OF ORES

Filed Aug. 16, 1966

United States Patent Office 3,379,310
Patented Apr. 23, 1968

3,379,310
METHOD AND APPARATUS FOR THE WET GRAVITY CONCENTRATION OF ORES
Ernst Reichert, Southport, Queensland, Australia, assignor to Mineral Deposits Pty. Limited, Sydney, New South Wales, Australia, a company of New South Wales
Filed Aug. 16, 1966, Ser. No. 572,815
Claims priority, application Australia, Aug. 17, 1965, 62,881/65
8 Claims. (Cl. 209—459)

ABSTRACT OF THE DISCLOSURE

Apparatus and a method for the concentration of ores in flowable pulp form in which the pulp is caused to flow gravitationally and radially outwardly down a conical fanning path, then radially inwardly down a conical concentration path, whereafter ore values are removed near the bottom of the concentration path, the fanning path being arranged so that it gets progressively steeper towards its lower end, the fanned pulp being divided into two parts and fed to separate portions in the concentration path which respectively handle said fanned pulp parts, the values output from said two separate portions being recombined for further treatment and subsequent removal.

---

This invention relates to the gravitational concentration of granular or particulate ores; the ore being treated in the form of a pulp (that is, a suspension or aggregation of solid particles in a liquid which is usually water) in which the various kinds of particles of the ore have differing specific gravities.

It is already known to treat a pulp, of the kind indicated to separate its solids content into a values or "concentrates" fraction of heavy particles, and a "tailings" fraction of lighter particles, by causing the pulp to flow of its own accord (gravitationally) down an inclined path in which the pulp stream becomes greatly spread out laterally and consequently, and correspondingly, thinned in depth. This is known as "fanning" the pulp stream, and a common way of doing this is to deliver the pulp to the top of a fanning cone at such rate that when it reaches the outer and lower periphery of the cone the stream is so slight in depth that the particles in it are all or largely brought to virtually the same elevation within the stream. The pulp stream is then "de-fanned" by letting it run towards the centre of a de-fanning or concentration cone which is inverted relative to the fanning cone.

During concentration the pulp stream again thickens in depth, but in the coming together and jostling of the particles during this thickening action the heavy values tend to remain at the bottom of the stream and at the same time tend to force the ligher tailings particles to the upper regions of the stream. When this occurs it is a relatively simple matter to skim the value particles from the bottom of the stream thus to effect the required separation.

A single fanning and concentrating treatment will only rarely be a sufficiently critical separation of the pulp particles; almost invariably (in such a single treatment) some tailings particles will remain with the values and some value particles will stay with the tailings. Hence it has been usual to build concentrator apparatus of the kind under discussion with a relatively large number of cascading fanning and concentrating stages in which both the initially separated fractions are re-treated several times over, in much the same way as in the initial stage.

The prior concentrator apparatus referred to above has been fairly effective in performing the required separations; but not entirely so, because the pulp streams running down the cones tend to halt in a patchy manner thus establishing what may be regarded as minute dams of stationary particles which cause turbulences and generally spoil the essential evenness of the fanning and concentrating process steps. In this connection it will be realised that the ideal flow rate, and hence the path angle for the pulp is that which is only just sufficient for the particles gravitationally to flow down the cones without coming to rest thereon; in short, these angles should be as near to the horizontal as possible compatible with continuity and non-turbulence of pulp run.

The main forces operating to retard free running of the pulp are the frictional forces due to contact of particles with the cone surfaces, and particle-to-particle friction; but these forces are by no means uniform throughout the path length of a fanning or concentrating run. At the top of a fanning run only very few of the particles are in actual contact with the fanning cone whereas at the end of the run of or at least a much larger proportion of the particles are in touch with the cone surface; the particles actually touching the cone at the top of the run are loaded with the weight of overlying particles; interparticle friction is at a maximum at the top of the run and at a minimum at or towards the bottom thereof; free rollability of particles (which are not too jagged to roll) varies as the run proceeds; the fluidity of the pulp stream varies as the run proceeds; and the co-efficients of friction of the values and the tailings, relative to the cone surfaces are different.

Because of the variable factors just referred to, it has hitherto been necessary to employ cone path angles which are in the nature of compromises. If the cone angle is ideally of minimum steepness, fanning efficiency is high, but the risk of stream obstruction due to particle halt becomes correspondingly high, this can be remedied, to some extent by extensive supervision, but that is uneconomic, and hence it has been usual to make the cone angles a good deal steeper than they ought to be for efficient fanning, simply to ensure continuity of pulp run without necessity for supervision.

My experiments have shown that resistance to free gravitational flow of a pulp stream down a fanning cone increases approximately in proportion to the fanned-out circumferential breadth of the stream, and that this resistance increase can be counteracted by making the flow path down the cone progressively steeper as the bottom end of the path is approached.

Thus, an important feature of the present invention resides in the method step of causing an ore pulp being subjected to a gravitational fanning operation to follow a path which becomes progressively steeper as the fanning operation proceeds. A concomitant feature of the invention resides in the provision of apparatus in the form of a fanning surface which becomes progressively steeper as the lateral width of the fanning path increases. Such a fanning surface, instead of being conical as in comparable concentrator apparatus used heretofor, is arcuate. The curvature of this surface may be parabolic or of other curvature, for preference however, the fanning surface is an element of a sphere.

My experiments with curved fanning surfaces as discussed above have shown that for a given size of fanning surface the rate of pulp supplied to the surface can be increased almost two-fold and the fanning operation remain effective, provided a sufficiency of concentrator surface is provided to deal with the output of the fanning surface. Thus, it is a subsidiary feature of the present invention to associate with an arcuate fanning surface of the kind defined above, concentrator surfaces of such sufficiency; and this, without substantial increase in the overall dimensions of the installation as a whole.

To a large extent concentration or de-fanning efficiency may be raised by use of curved de-fanning surfaces which also become progressively steeper in the direction of pulp travel down them, and such a de-fanning surface or surfaces may be associated with an arcuate fanning surface as discussed above; moreover, I have found it preferable to associate two concentrator elements with a single curved fanning element and to divide the output of the fanning element substantially equally between the two de-fanning surfaces associated therewith.

It will be noted that in the above discussion concerning curvature of the fanning and concentrator surfaces, it is stipulated that both such surfaces become steeper in the downstream direction. That is, as the pulp stream thins in the case of the fanning element, and as the pulp stream thickens in the case of the concentrator element or elements. This might appear to be contradictory, but that is not so; because experiment has proved otherwise. One of the variable factors in this connection is the progressively increasing particle density of values in the lower portion of the pulp stream as concentration goes forward. It would appear that the values particles have a higher coefficient of friction relative to the concentration surfaces than do the non-value particles and hence the desirability for the concentrator surfaces to become steeper in the downstream direction if stream halting on those surfaces is to be avoided.

Still another aspect arising out of my experiments shows that a significant cause of fanning and to some extent de-fanning inefficiency arises if there are any factors present giving rise to turbulence or other lateral deviations of the pulp stream from a pathway for the particles which, having regard to the curvature of the path, is other than the shortest distance down the path. In short, greater efficiency will accrue if the pulp particles proceed down the separative surfaces along paths which (when the apparatus is viewed in plan) are truly radial. Thus, it is another object of this invention, at least in the preferred embodiments thereof, to make provision to prevent or reduce turbulence or other lateral deviation of particles from a radial path as just discussed.

Having regard to all of the foregoing, the present invention in its broadest aspect consists in a method for the wet gravity concentration of particulate ores which includes the steps of gravitationally fanning a pulp stream containing ore particles, then gravitationally concentrating the fanned stream so that value particles of higher specific gravity in said stream concentrate as a stratum at the bottom thereof, and removing said stratum from said stream; characterized in that in performing said fanning step said pulp is directed along a fanning path which progressively becomes steeper towards its lower end.

The invention also consists in apparatus for use in performing the said method.

Examples of apparatus for use in performing the said method are illustrated in the drawings herewith:

Figure 1:
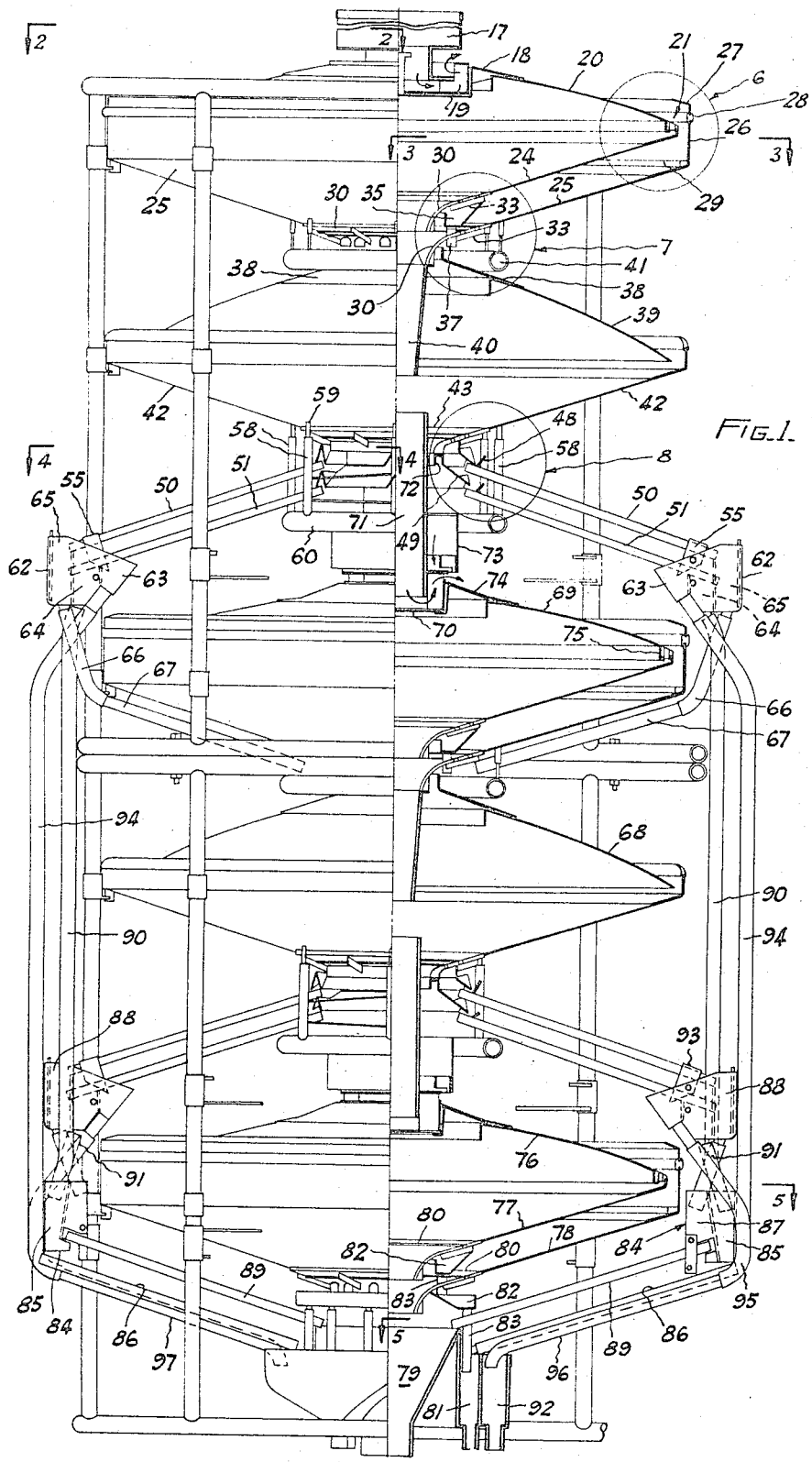
FIGURE 1 is a side elevation, half in cross-section of a multi-stage concentrator unit.
Figure 6:
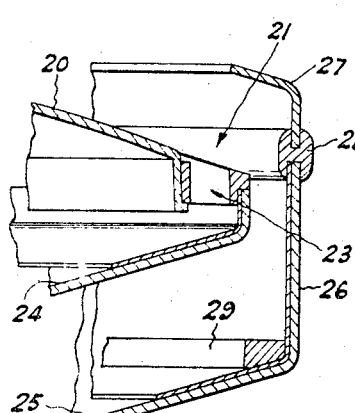
Figure 7:
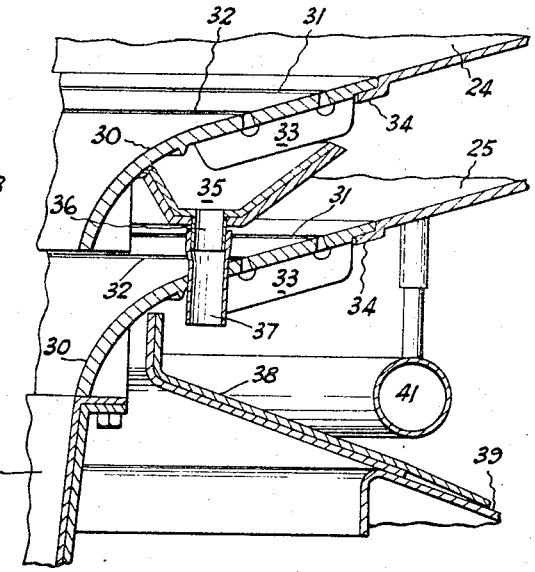
Figure 8:
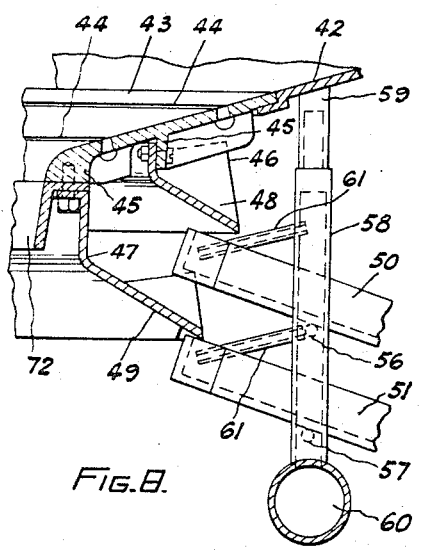

FIGURES 6, 7 and 8 are enlarged details of the parts ringed by circles 6, 7 and 8 respectively in FIGURE 1.

Figure 9:
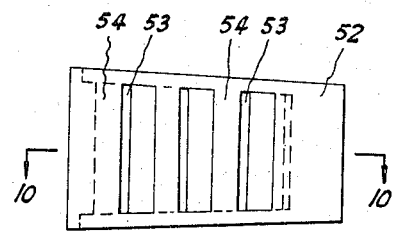

FIGURE 9 is a plan showing a slot arrangement in a pinched sluice.

Figure 10:
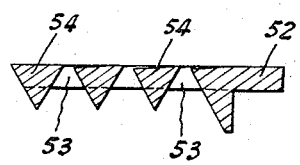

FIGURE 10 is a sectional side elevation taken on line 10—10 in FIGURE 9.

Figure 11:
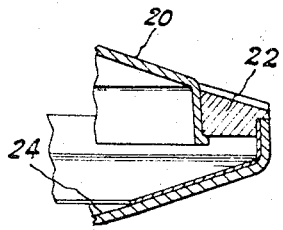

FIGURE 11 is a sectional detail virtually repeating a portion of FIGURE 6 but with the section plane slightly displaced from the section plane of FIGURE 6.

Figure 12:
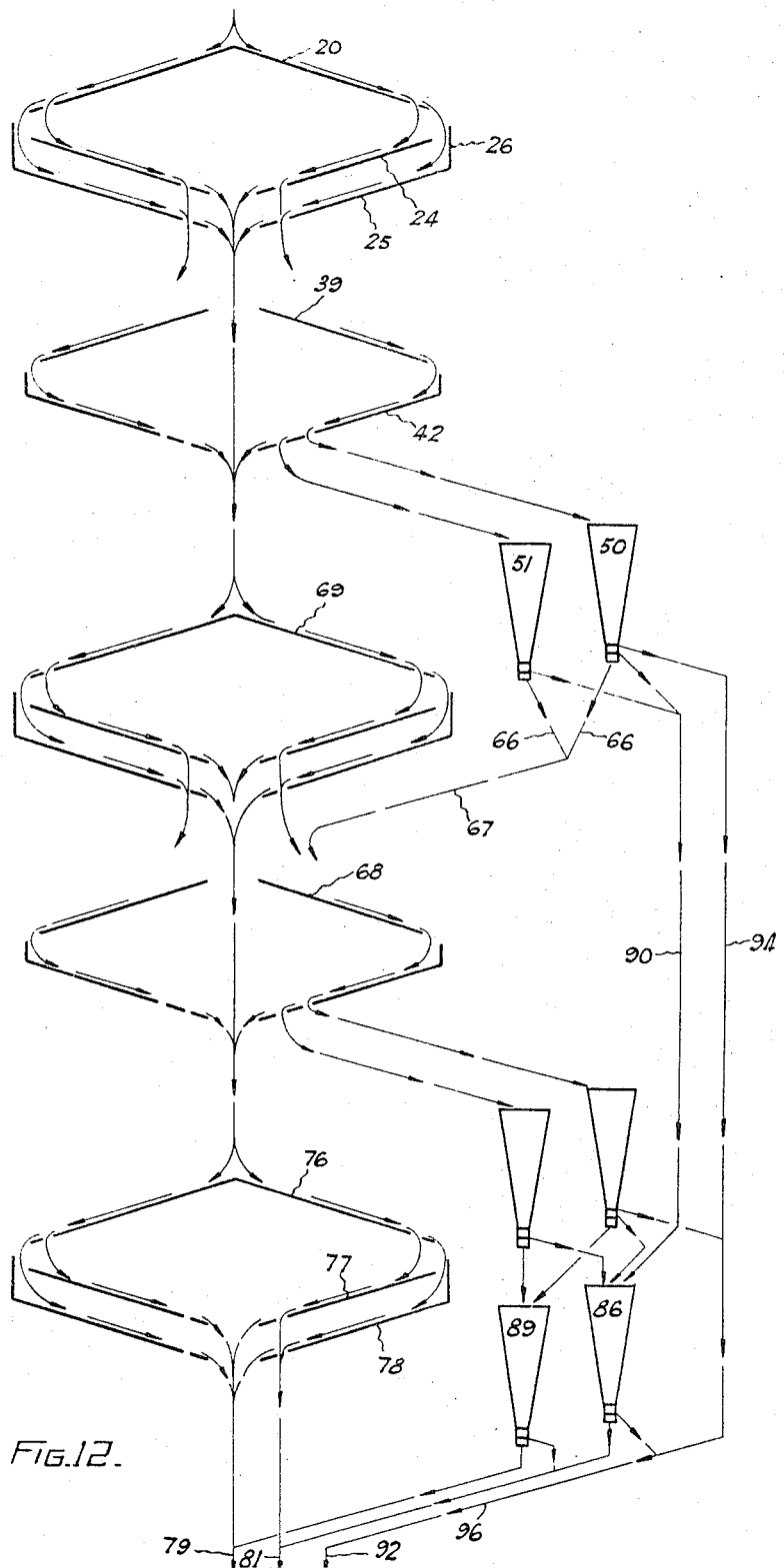

FIGURE 12 is a schematic flow sheet representation of the multi-stage concentrator shown in FIGURE 1.

Figure 13:
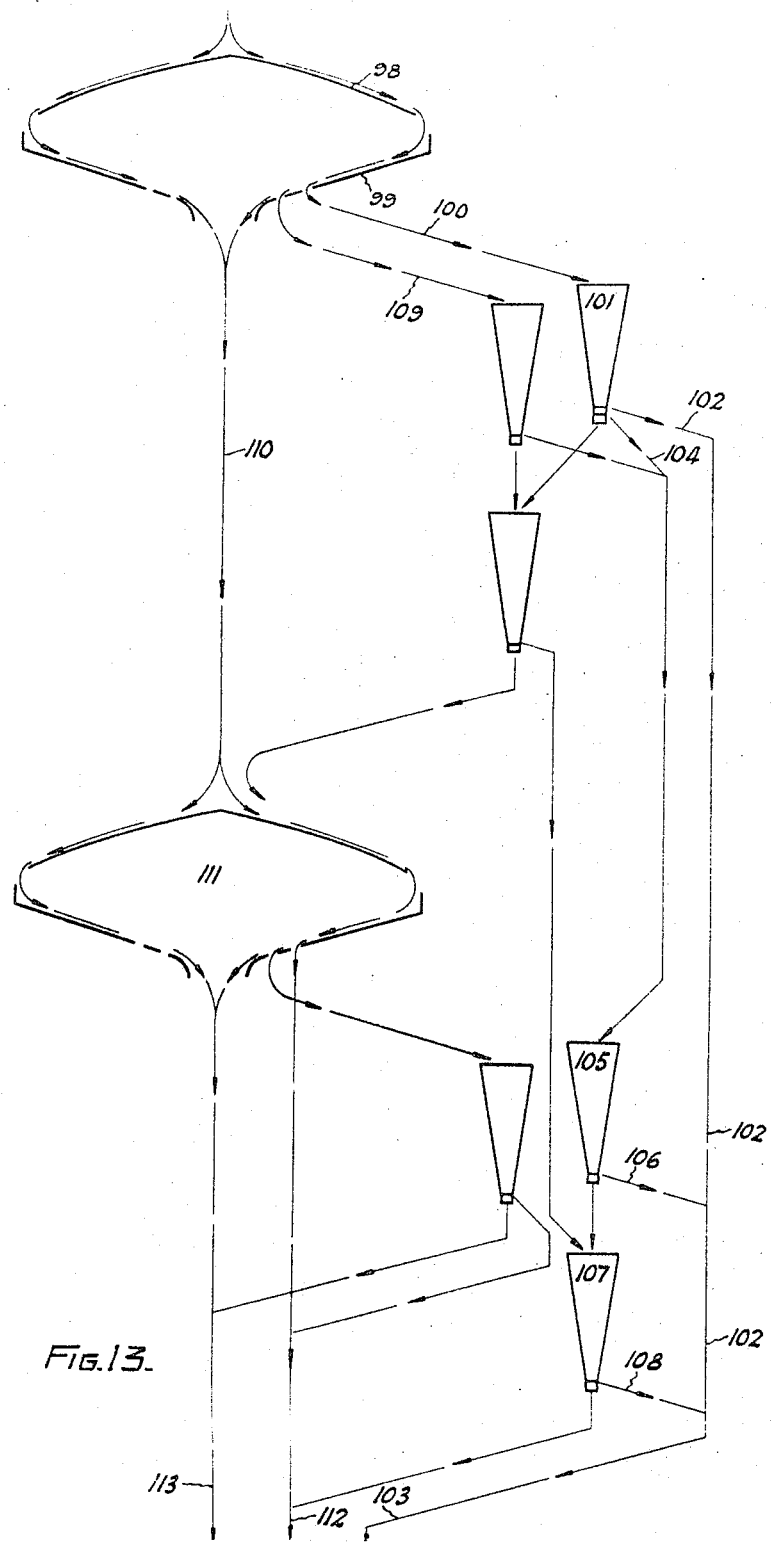

FIGURE 13 is a view similar to FIGURE 12 of a multi-stage concentrator of modified construction intended for low pulp feed rates.

Figure 14:
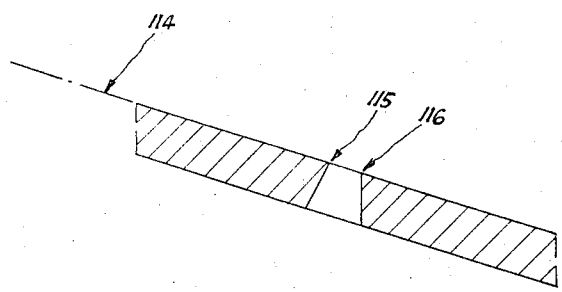
Figure 15:
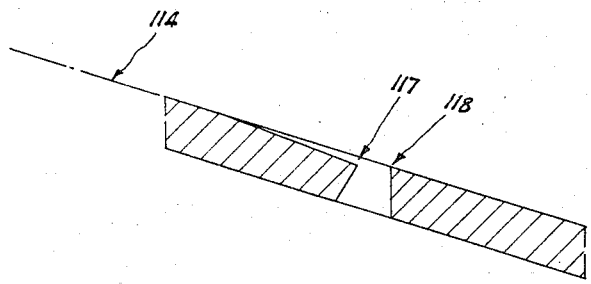
Figure 16:
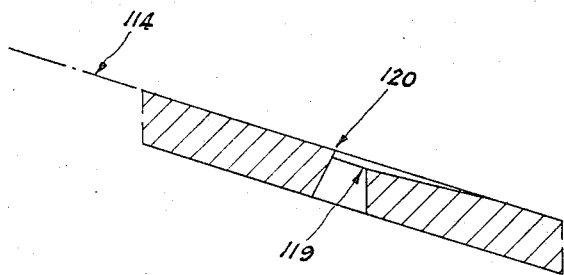

FIGURES 14 to 16 are enlarged sectional detail views respectively showing three different forms of concentrator values removal slots.

Referring to FIGURES 1 to 12, pulp to be treated is fed into a bowl 17, from which it flows on to an apron 18 after negotiating baffle fins 19. These fins are L-shaped and presented edgewise to the stream; their purpose is to reduce lateral turbulence by channelling the stream radially on to apron 18. From the apron, the pulp flows on to the upper end of a fanning element 20. The fanning surface is curved so that its slope continuously increases so to gravitate the pulp stream down the fanning surface at a speed just high enough to transport all solid particles and at the same time avoid excessive turbulence or particle halting; this is achieved with a fanning surface of steadily increasing slope since the pulp stream thins and loses energy as it moves down the surface and a greater slope becomes increasingly necessary to transport the solid particles.

When the pulp reaches the bottom of the fanning surface 20 it is divided into two substantially equal streams by a splitter ring 21 in which the total flow is first divided into a large number of separate streams by equally spaced vertical circumferentially thick walls 22. The open spaces between these walls (holes 23) are of the same width as the wall thickness, and they feed the pulp passing through them on to the upper end of a de-fanning or concentrator surface 24. The feed passing over the walls 22 falls to the upper end of a second concentrator surface 25.

The sloping surfaces 24 and 25 could be flat (truly conical) but in strong preference they are curved so to become steeper progressively towards their lower ends.

The upper edge or rim 26 of the lower concentrator 25 is furnished with a top coaming 27 held in junction ring 28 which surrounds the fanning surface 20 so to ensure against splash or other loss from the bottom of that surface. A buffer strip 29 may be installed at the upper end of the lower concentrator 25 to lower the pulp inlet velocity thereto.

Pulp deposited on the concentrators 24 and 25 proceeds gravitationally towards the bottoms and centres thereof as slow streams which progressively thicken as the circumference decreases. In this thickening, the tailings particles of lower specific gravity are crowded to the upper reaches of the stream and the value particles of higher specific gravity remain at the bottom of the stream as a separable stratum.

At the bottom and centre of the concentrators 24 and 25, both are fitted with an accurately formed centre insert 30 in which are machined continuous (endless) circumferential values removal slots 31 and 32. Two slots are shown (in each insert) in this particular unit. The structure of each insert is carried past the continuous slots by the integral bridge pieces 33. Each insert 30 rests on a ledge 34 (FIG. 7), so that it may be readily removed and replaced.

The profile of the slots 31 and 32 is such that the width of the slot increases from the inlet (at top) to the discharge side (underneath) to ensure that any particles passing through the inlet ends of the slots will pass freely through the remainder of the slots. Neither the down-stream nor the upstream lips of these slots protrude above the surface of the insert, and the removal of the stratum of heavy concentrate particles is achieved by flow of the lower stratum down through the slot rather than by previous arrangements in which it was attempted to cut off the lower stratum with a knife-edge raised above the surface on which the pulp flows. The present arrangement does not necessitate a sharp edge on the down-stream lip of the slot and even if this lip is deliberately slightly and smoothly rounded it does not appear unduly to impair efficiency of separation; moreover, it has the advantage of reducing the sensitivity of the concentrator to wear of the slot edges and reduces or eliminates, accumulation on the downstream lip of the slot of any fine fibrous matter that might be present in the feed pulp.

The concentrate of particles of high specific gravity so removed by the slots in the upper insert 30 is collected in an annular vessel 35 and fed via short pipes 36 and hoses 37 extending through holes in the lower insert 30 where it combines with the concentrate extracted by the lower insert by mixing on an apron 38 discharging onto the upper end of a second fanning surface 39. The remainder of the pulp stream (or tailings) from both concentrator surfaces 24 and 25 is combined and passed through the tapered chute 40.

It will be appreciated that the slope of the concentrator surfaces and the fanning surfaces will vary depending on the density of the pulp to be run over them. Experiment has shown that relatively high pulp densities (55% to 65% solids by weight in the pulp) allow the most efficient performance of separation of high specific gravity fractions. With such pulp densities a suitable general slope for these cones is from 13° to 20°. Where these surfaces are curved, as explained above, much the same general angles apply, in that the curvature is relatively slight. As a general rule the tangent at the steepest portion may incline to the horizontal at an angle from 3° to 6° greater than that at the point of least steepness.

In the embodiment of the invention described above the initial concentration (de-fanning) is achieved on the two cones 24 and 25 operating in parallel, each accepting half the total feed of pulp from the fanning element and giving concentrates and tailings which are subsequently combined (concentrates from upper element with concentrates from lower element; and tailings from upper element with tailings from lower element). Since the overall efficiency of the separation process decreases as the load on the concentrating elements increases, this particular arrangement of a single fanning element with two concentrating elements, without loss in the efficiency of the separation process, allows twice the headfeed quantity to be handled by the initial fanning element without duplication of facilities for pulp infeed, or for concentrate and tailings handling, or virtually without increase in the installation space required.

In the particular concentrator unit being described, the combined concentrates from the first two concentrating elements 24 and 25 are fed on to the upper end of the second fanning element 39. Since the concentrates received by element 39 are of higher pulp density than the original feed, due to dewatering of the lower stratum of pulp in the primary concentration, water is added through holes (not shown) in a water supply ring 41 which is supported on lugs on the under surface of the lower of the primary concentrating elements 25. The fanning surface 39 preferably has a somewhat greater mean slope than the primary fanning surface 20 due to the lower feed rate applied and the higher mean density of the solid particles, both of which allow friction to have greater flow retarding effect during pulp flow down surface 39 but as with the primary fanning surface 20 the slope of the fanning surface 39 continuously increases in the downward direction.

When the pulp reaches the bottom of the fanning element 39 it falls, as a thin cylindrical curtain, to the upper end of a concentrator element 42 which is similar in shape and function to the surfaces 24 and 25.

Referring mainly to FIG. 8 which shows in detail the construction of the lower and discharge end of element 42; insert 43 is of similar design to those fitted to the primary concentrating elements. It has two endless circumferential values removal slots 44 and also projections 45 suitable for the attachment of annular launders 46 and 47. These catchment launders each have six outlet chutes 48 and 49 which divide the flow of concentrate passed through each of the slots 44 into six substantially equal portions.

Figure 4:
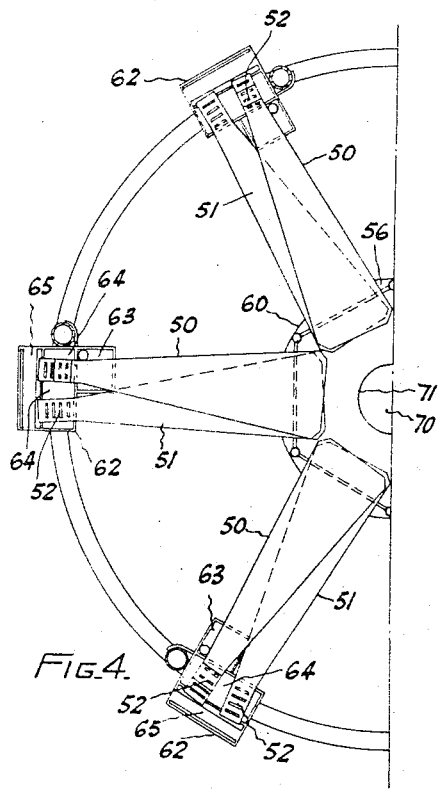

Referring mainly to FIGS. 4 and 8, the portions of first slot concentrate and second slot concentrate are respectively fed into six tapered chutes 50 placed above six tapered chutes 51.

The tapered chutes 50 and 51 are of the known kind commonly called "pinched launders" and (see also FIGS. 9 and 10) they have end-piece inserts 52 provided with multiple slots 53 separated by walls 54. Their operation is similar to that of the concentrating elements in that values particles are discharged through the slots, while tailings tend to ride over and beyond the slots.

The separative efficiency of a pinched launder is lower than that of a concentrating element (such as 24 or 25) due to the disturbing effects on the pulp flow of the pinched launder sidewalls; and also, as is obvious, their de-fanning effect is very small because lateral contraction of their working surface width is very small. Pinched launders are only used in particular applications within a concentrator in which there is insufficient feed mass to satisfactorily supply a complete concentrating element.

Referring mainly to FIG. 1, a movable splitter chute 55 may be fitted to each pinched launder to allocate required destinations for matters falling through the slots 53. Such a splitter chute is of known kind; it may be variously positioned longitudinally of its launder to send the output of one or more of the slots in one direction, and the output of the remaining slots in a different direction.

Now referring mainly to FIG. 8, the upper ends of the pinched launders 50 and 51 are supported on rods 56 and 57 attached to tubes 58 which in turn are attached to lugs 59. These lugs are secured to the underside of the concentrating element 42. The tubes 58 are connected to annular ring 60 which supplies dilution water by way of the tubes 58 and small branch tubes 61 to the upper ends of the pinched launders; this water is required since the pulp bled off through the slots 44 is of higher pulp density than the feed to the concentrator 42 which is, of course, maintained at the optimum for its own work of separation; consequently dilution of the pulp in the pinched launders is required to lower its density to the optimum for separation therein.

Referring again to FIG. 8, it is apparent that the concentrate bled off through the higher slot 44 of the insert 43 will contain a higher proportion of value particles than that of the concentrate bled off through the lower second slot 44, and since the first slot concentrate is fed to the upper layer of pinched launders 50 and the second slot concentrate is fed to the lower layer of pinched launders 51, the concentrate bled off through the slots 53 of the upper layer of pinched launders (50) will contain a higher proportion of high specific gravity particles than is contained in the concentrate bled off through the slots 53 of the lower layer of pinched launders (51). Again, the concentrate bled off from the upper layer of pinched launders 50 will contain the highest proportion of high specific gravity particles in the pulp bled off from the first (upstream) slot 54 of the upper layer of pinched launders, and will contain progressively lower proportions of high specific gravity particles in more downstream slot discharges. These proportions will vary with pulp grade fed to the concentrator. Thus, by adjustment of the "control splitters" 55 it is possible to achieve more-or-less constant "richness" proportions of value output from the pinched launders notwithstanding variations in the value proportions in the headfeed to the concentrator unit.

Referring mainly to FIGS. 1 and 4 the upper and lower layers of pinched launders, 50 and 51 both discharge into collector boxes 62 each of which has a compartment 63 for that portion of upper launder concentrate removed by the control splitter 55, a compartment 64 for the remainder of the pinched launder concentrate and a compartment 65 for the combined pinched launder tailings.

Figure 2:
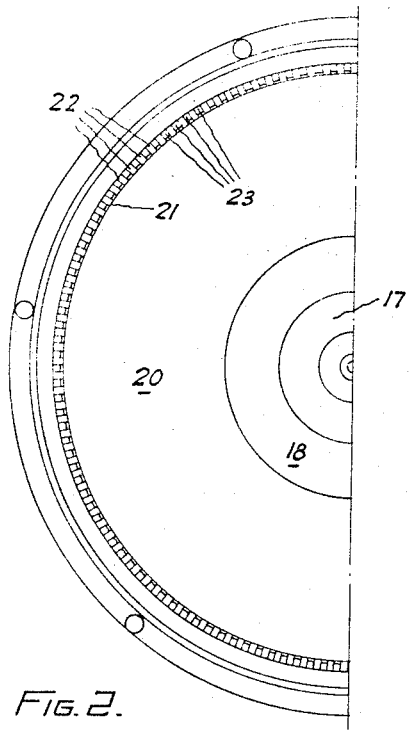
FIGURES 2 to 5 are respective cross-sectional plans taken on lines 2—2, 3—3, 4—4 and 5—5 in FIGURE 1. These are half sections of which the remaining halves (not illustrated) would be mirrored images of those that are shown.
Figure 3:
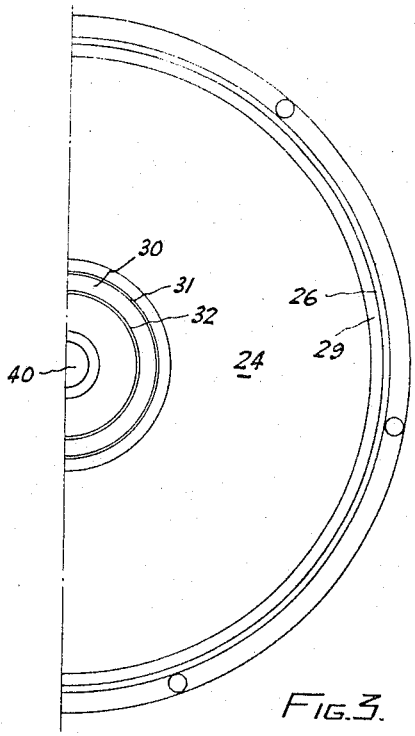

Referring to FIGS. 1 and 2, the tailings from the primary concentrators 24 and 25 are combined with the tailings from the single concentrator 42, and the construction of the concentrator unit to this point (by which the headfeed passes over a single fanning element 20, over two concentrating elements (24 and 25) in parallel, and from which the value concentrates are passed over a second fanning element 39 and a single concentrating element 42, and from which the value concentrates put out by element 42 are passed through pinched launders fitted with variable controls 55; and in which the tailings from the primary concentrators 24 and 25 are combined with the tailings from element 42) is referred to herein as "one stage" of the illustrated concentrator unit.

It is preferable to use more than one such stage in a practical concentrator unit; and again referring to FIGS. 1 and 12, a concentrator using two full stages plus a partial third stage is there shown. The second stage differs from the first stage only in that the combined tailings from the first stage tray collector boxes 62 are delivered, via hoses 66 and tubes 67, directly to the second stage single fanning element 68 instead of to the top of the second stage initial fanning element 69.

In the particular concentrator unit shown in FIG. 1 the feed to the top of the second stage consists of the tailings from twin elements 24 and 25 and those from single element 42. Those from the twin elements arrive on base 70 by way of chute 40 and a duct 71. Those from the single element 42 leave that element by way of neck ring 72 and then flow down about the outside of duct 71 and through outer duct 73, thus to join the pulp stream welling up from base 70 and mix with it on the apron 74 leading on to fanner 69.

The pulp fed to the top of the second stage fanner 69 proceeds to circumferential splitter ring 75 (similar to that marked 18 in the first stage) and then proceeds as explained in terms of the first stage.

Still referring to FIGS. 1 and 12, the particular concentrator unit shown, has two stages, as described above, followed by a scavenger stage consisting of a fanning element 76 and twin concentrator elements 77 and 78. These produce value exhausted tailings via centre chute 79 and a "middlings" fraction via slots 80. The middlings proceed to outlet 81 by way of collector troughs 82 and pipes 83. The middlings may, of course, be assessed as to whether it is worthwhile, economically, to re-treat them by including them with pulp being treated for the first time (by delivery into bowl 17).

Figure 5:
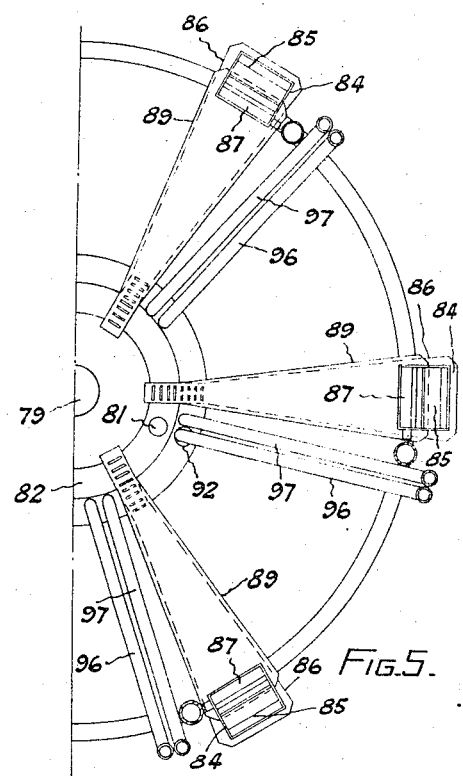

Referring to FIGS. 1, 5 and 12, there is attached to the frame of the concentrator unit six final pinched launder feed boxes 84, each containing an outer compartment 85 which discharges on to a pinched launder 86. An inner compartment 87 receives the combined tailings from the second stage pinched launder collector boxes 88 feeding them to upper final pinched launders 89 from which the tailings pass into the central tailings outlet 79 and from which the higher specific gravity concentrates pass into the middlings outlet 81.

The high specific gravity concentrates from the first stage pinched launder collector boxes 62 (other than those removed by way of the control splitters 55) plus the similar concentrates from the collector boxes 88 are transported via tubes 90 and 91 to the outer chambers 85 of the feed boxes 84, from which the high specific gravity concentrates are discharged onto the pinched launders 86. This produces a high specific gravity concentrate which discharges into the values outlet 92 and not completely value-exhausted tailings which discharge into the middlings outlet 81.

The high value concentrates removed by the first stage control splitters 55 and the second stage control splitters 93 are discharged via hoses 94 and 95 and tubes 96 and 97 into the values outlet 92 for discharge as final concentrate. These various separative steps will be more clearly appreciated by reference to FIG. 12.

The arrangement of the invention shown in FIGS. 1 to 12 is one suited for dealing with very large pulp infeed; being able to handle such an infeed efficiently and with great economy of space owing to the entire concentrator unit being in the nature of a single columnar structure incorporating arcuately sectioned fanning surfaces feeding to twin concentrator or defanning surfaces in each of a plurality of stages.

Where, however, the amount of ore available is not sufficient to keep a concentrator, such as that of FIGS. 1 to 12, fully loaded (in which condition it performs with greatest efficiency) a simpler embodiment of the invention may be employed. Such an embodiment is that shown in FIG. 13.

In this embodiment there are two similar stages. The first comprises a downwardly curving fanning surface 98 which discharges pulp directly on to a single de-fanning concentrator surface 99, which is preferably curved so that it becomes progressively steeper towards its lower end. This divides the pulp into a first high value fraction 100 which is fed to a plurality of pinched launders 101 (only one of which is shown). Launders 101 each redivide the pulp received by them into three further fractions, one of which (102) being the richest fraction, proceeds directly to a values outlet 103.

The second less rich fraction 104 from launder 101 proceeds to launder 105 and adds its rich fraction 106 to fraction 102 and delivers its tailings to still another launder 107, which in turn adds its quota of high grade concentrate 108 to fraction 102.

The second less rich fraction 109 from the primary concentrator 99 receives similar upgrading treatment in the several other launders shown in FIG. 13, and the first stage tailings stream 110 proceeds directly to the second stage 111 for further refining.

It is believed that the nature of the various other grading actions will be apparent by following the arrowed lines in FIG. 13. The net result of these actions being to deliver high grade concentrates to values outlet 103, middlings (which may be retreated) to middlings outlet 112 and tailings (which may be discarded) to tailings outlet 113.

Earlier herein reference was made to the profile of the values removal slots in the concentrators; that is, the slots such as 31 and 32 in insert 30 (see FIG. 7) and 44 in insert 43 (FIG. 8). The preferred forms of these slots are shown in FIGURES 14 to 16. In none of these three forms do the slot lips protrude through the surface level 114 of the inserts in which they are formed.

In FIG. 14, both slot lips 115 and 116, are disposed within surface 114. This would be a normal form usable with particulate ores in which prior inspection and evaluation shows the particles of the ore to be substantially uniform; that is, without excessive proportions of oversized particles either as values or tailings.

Where the ore includes a substantial proportion of relatively large value particles, it is an advantage to depress the upstream lip 117 (see FIG. 15) slightly below the level of the downstream lip 118. Experiment has shown that in such a slot arrangement large grains of value mineral will enter the slot, whereas otherwise, due to their momentum, they would tend to ride over the slot and be lost.

Where the ore contains a substantial proportion of coarse grained valueless gangue and or a high proportion of very fine value particles, it is similarly advantageous to depress the downstream lip 119 (see FIG. 16) slightly below the level of the upstream lip 120. In this case it is found that the lowering of the downstream lip prevents or reduces blinding of the slot by the oversized gangue particles.

I claim:
1. Apparatus for the wet gravity concentration of par- ticulate ores, comprising: a fanning element shaped to define a gravitational pulp flow path which progressively becomes steeper towards its lower end, means for delivering ore in the form of a pulp to the upper end of said fanning element, a splitter ring which constitutes the lower end of said fanning element and is adapted to divide pulp leaving said fanning element into two pulp parts, two concentrator elements mounted below said fanning element, means for respectively directing said pulp parts on to the upper ends of said concentrator elements, and means for removing a values stratum from the bottom of each of said pulp parts on said concentrator elements before said pulp parts reach the lower ends of said concentrator elements.

2. Apparatus according to claim 1 wherein each of said concentrator elements is shaped to define a pulp flow path which progressively becomes steeper towards its lower end.

3. Apparatus according to claim 1 which includes a second fanning element disposed below said concentrator elements and shaped to define a gravitational pulp flow path which progressively becomes steeper towards its lower end, means for delivering both said values strata to the upper end of said second fanning element as a second pulp stream, a further gravitational concentrator element positioned below said second fanning element so to receive on its upper end pulp falling from the lower end of said second fanning element, and means for removing a further values stratum from the bottom of a second pulp stream on said further concentrator element before said second stream reaches the lower end of said further concentrator element.

4. Apparatus according to claim 3 wherein said further concentrator element is shaped to define a pulp flow path which progressively becomes steeper towards its lower end.

5. A concentrator unit comprising apparatus according to claim 3, and constituted by a first stage and at least one further stage, a plurality of pinched launders, means for feeding said further values stratum on to the upper ends of said pinched launders, and means for feeding the remainder of the pulp stream originally fed into said first stage from which said further values stratum has been removed to the top of said second stage.

6. A method for the wet gravity concentration of particulate ores, comprising the steps of: gravitationally fanning a pulp stream containing ore particles by directing said pulp stream along a fanning path which progressively becomes steeper towards its lower end, dividing the fanned stream into two parts as it leaves said fanning path, gravitationally concentrating said two parts separately so that in each part value particles of higher specific gravity concentrate as a stratum at the bottom thereof, removing said stratum from each of said parts, uniting the removed strata thereby to form a second pulp stream, fanning said second pulp stream by directing it along a fanning path which progressively becomes steeper towards its lower end, gravitationally concentrating said fanned second stream so that value particles in said second stream concentrate as a further stratum at the bottom thereof, and removing said further stratum from said second stream.

7. The method according to claim 6 wherein said concentration of said fanned second stream is performed by directing said fanned second stream along a concentration path which progressively becomes steeper towards its lower end.

8. A method according to claim 6 wherein said removed further stratum is still further treated by upgrading thereof in a plurality of pinched launders, and wherein the remainder of the original pulp stream from which said further strata was separated is still further treated by subjecting said remainder to a repetition of the method steps already performed.

References Cited
UNITED STATES PATENTS

| | | | |
|---|---|---|---|
| 455,498 | 7/1891 | Woods | 209—438 |
| 776,189 | 11/1904 | Strange | 209—458 |
| 1,104,969 | 7/1914 | Darrow | 209—498 |
| 2,329,781 | 9/1943 | Overhultz | 209—438 |
| 2,644,583 | 7/1953 | Cannon et al. | 209—459 |
| 2,660,305 | 11/1953 | Labouygues | 209—157 X |
| 2,766,882 | 10/1956 | Cannon et al. | 209—458 X |
| 2,966,262 | 12/1960 | Hobart | 209—157 X |
| 3,000,502 | 9/1961 | Hobart | 209—458 |

FOREIGN PATENTS

| | | |
|---|---|---|
| 231,070 | 1/1960 | Australia. |
| 247,676 | 11/1962 | Australia. |
| 100,455 | 9/1965 | Great Britain. |

HARRY B. THORNTON, *Primary Examiner.*

TIM R. MILES, *Examiner.*